March 18, 1952  R. D. COLGROVE  2,589,776
FISHING REEL
Filed June 28, 1948

INVENTOR.
Robert D. Colgrove
BY
Atty.

Patented Mar. 18, 1952

2,589,776

UNITED STATES PATENT OFFICE 2,589,776

FISHING REEL

Robert D. Colgrove, Vancouver, Wash., assignor to Colgrove Tackle Co. Inc., Vancouver, Wash.

Application June 28, 1948, Serial No. 35,711

2 Claims. (Cl. 242—84.1)

My invention pertains to fishing reels, and relates particularly to the novel construction of a casting reel in which the spool mounting is hinged, spring mounted and trigger actuated, whereby the axis of said spool may be shifted rapidly and automatically between normal planes during the casting operation.

There are certain recognized difficulties attending the present methods of casting. The axis of the spool upon which the fishing line is wound generally extends transversely of the longitudinal dimension of the fishing pole. The cast is made by swinging the pole through a vertical or horizontal arc and allowing the weighted end of the line to be thrown outwardly as the line is paid off from the rotating spool. With a free-running spool, however, the initial force exerted upon the line after the pole has been swung about greatly accelerates the rotation of the spool. As the speed of the cast line passes its point of greatest velocity and begins to decrease, the rapidly rotating spool exceeds the speed with which the line is being paid out therefrom. Accordingly the spool overruns the line and the latter is caused to be rewound upon the spool in a reverse direction until the excess line is taken up. At this point the rotation of the spool is suddenly arrested and the outward cast of the line is stopped abruptly. The above described phenomenon, commonly known as "backlash," not only results in the inevitable loss of the fishing lure or bait but causes tangling of the line which requires substantial time to rectify.

In order to avoid backlash and its aggravating results, reels have been provided with means for braking the speed of the rotating spool during the casting of the fishing line. The frictional drag on the spool maintains a substantially constant pull on the line, thus preventing the reverse winding which characterizes backlash. This method of correction is not without disadvantage, however, for the resistance of the spool to rotation induced, not only by a brake, but also by the inertia of the moving parts and the running friction thereof, limits the distance to which the line may be cast.

By positioning the axis of the spool parallel with the longitudinal dimension of the fishing pole the line may be payed out during the cast over one end of the spool without the necessity of rotating said spool. That is, the line slithers off the forward end of the spool in a spiral fashion. Backlash does not obtain because the line is removed from the spool in response only to the forward pull of the line. There is no perceptible resistance to the uncoiling action, and therefore longer casts are readily attained.

But disadvantages have been encountered with reels constructed in the manner just described. The reels heretofore devised are mounted upon the fishing pole in such manner that the axis of the spool is either fixed in the position parallel with the longitudinal axis of the pole, or it may be rotated to that position from the normal transverse arrangement and locked prior to casting. One disadvantage of the first named construction lies in the awkward and unnatural manner in which the spool must be rotated when it is desired to reel in the line. Complicated mechanism must also be provided for such rewinding.

A disadvantage of both constructions resides in the fact that some means must be provided for holding the line upon the spool while the fishing pole is swung arcuately during the first step of the casting procedure. The line must be held during a portion of the swing in order to permit the weighted end of the line to follow the radial path of the pole, thereby to gather momentum which will carry the line outwardly when released. Heretofore the line has been held either by means of thumb pressure against the line wound upon the spool, or by complex devices incorporated with the reel. The former method is cumbersome and is not positive. The latter method is complicated and expensive.

It is therefore a principal object of my invention to provide a casting reel in which the spool thereof may be pivoted quickly and automatically from a position normal to the longitudinal dimension of the fishing pole to a position parallel thereto during the casting operation.

Another object is the provision of a fishing reel in which the spool thereof is releasably held for rotation about an axis normal to the longitudinal dimension of a fishing pole and trigger actuated to shift said axis parallel to the longitudinal dimension of said pole.

A further object is to provide a fishing reel in which the spool thereof may be held conveniently to prevent rotation about an axis normal to the longitudinal dimension of a fishing pole during the initial casting swing, then quickly shifted to an axial direction parallel with the longitudinal dimension of said pole for the completion of said cast, then after the cast has been made it may quickly and automatically be returned and latched in its original position.

These and other objects and advantages of my invention will appear from the following detailed description taken in connection with the accompanying drawing, in which.

Figure 1:
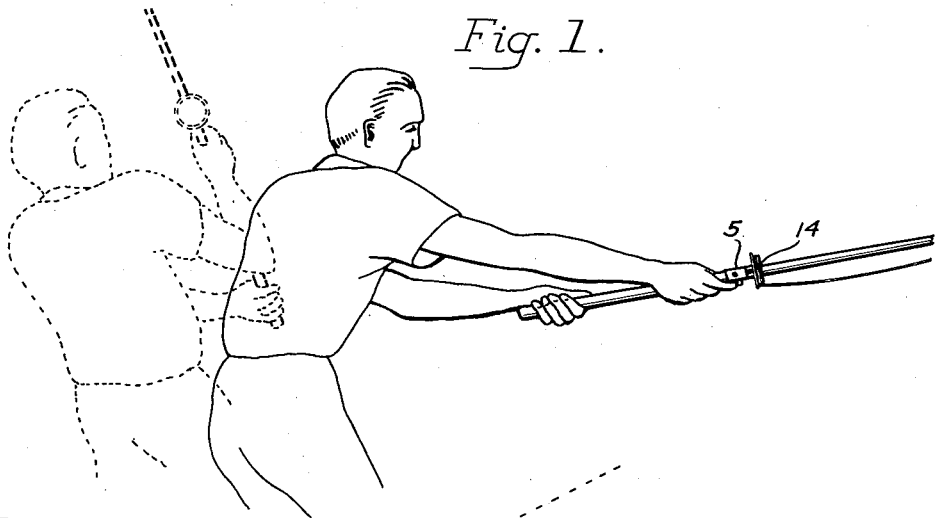
Fig. 1 is a side elevation showing the manner in which a fishing reel embodying my invention is used, the action being indicated in dotted outline.

The supporting member 1 of my reel is provided with fastening arms 2 at its ends for engaging the loops 3 which encircle the reel seat 4. The supporting member is thus releasably secured to the reel seat in accordance with conventional practice. An elongated base 5 is detachably secured intermediate its ends to the support 1 by means of the screw 6. One end of said base is bifurcated, forming spaced brackets 7 which lie in planes parallel to the plane of the supporting member 1. The opposite end of the base is also bifurcated, being provided with spaced flanges 8 which extend longitudinally of said base along the lateral sides thereof.

An arm 9 is bifurcated at one end to form spaced brackets 10 which are received between the flanges 8. A pin 11 extends through aligned holes in flanges 8 and brackets 10, thus pivotally joining the base 5 and arm 9 in cooperating relation. Adjacent the terminal end of arm 9 is a shaft 12 which extends transversely through said arm and is firmly secured therein. The end of the shaft which projects outwardly away from the base 5 is threaded to receive a nut 13 by means of which a spool 14 is secured for rotation on said shaft. The opposite end of the shaft is provided with a point 15 and an adjacent notch 16 for purposes to be explained hereinafter.

Figure 2:
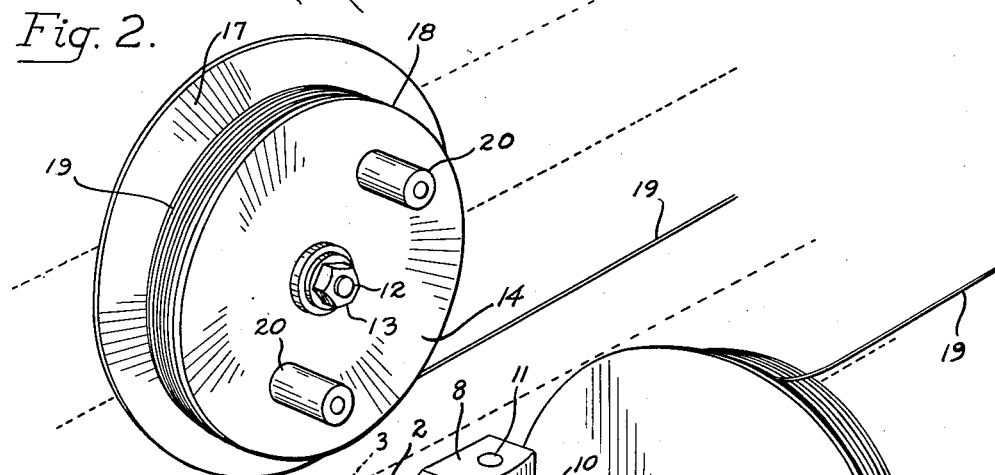
Fig. 2 is a perspective view of a fishing reel embodying my invention showing the same in winding position, the handle of the fishing pole being indicated in dotted outline.
Figure 3:
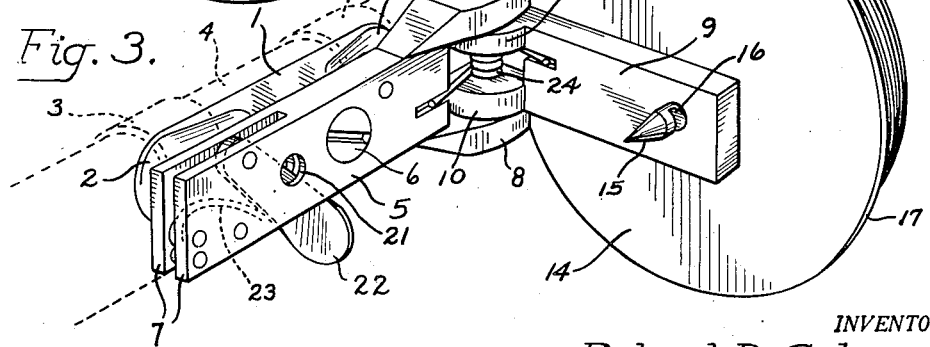
Fig. 3 is a perspective view of the reel shown in Fig. 2 in casting position; the handle and reel attaching means being indicated in dotted outline.

The spool 14 comprises a cylinder having circumferential shoulders 17 and 18 disposed at opposite ends thereof. As shown in the drawing, the diameter of shoulder 17 is greater than the diameter of shoulder 18. The fishing line 19 is coiled about the spool between the shoulders 17 and 18 and extends outwardly over shoulder 18 when the axis of the spool is arranged in parallel relation with the longitudinal dimension of the fishing pole, as illustrated in Fig. 3. One or more handles 20 are mounted on the face of the spool for turning the latter to wind in the line when the axis of the spool is arranged transversely of the fishing pole, as shown in Fig. 2.

A hole 21 extends transversely through the brackets 7 in position to receive the pointed end 15 of the shaft 12 when the arm 9 is swung into abutting relation with the base 5. A trigger 22 is pivotally mounted between the spaced brackets 7. A leaf spring 23 mounted between said brackets 7 engages the trigger resiliently to hold the latter in engagement with the notch 16 when the arm 9 is swung against the base. The trigger bisects a portion of the transverse hole 21, as shown in Fig. 3. Thus, as the arm is rotated clockwise against the base, the pointed end 15 of the shaft engages the edge of the trigger and urges the latter rearwardly until it snaps forwardly into the notch 16.

A coil spring 24 is wrapped circumferentially about pin 11 and the ends of said spring are slidably retained in slots formed in the base 5 and arm 9. The spring thus exerts a force which tends to extend said arm outwardly away from said base. Accordingly, when the trigger 22 is moved rearwardly until it is disengaged from the notch 16, the arm 9 is thrust outwardly, pivoting about pin 11. The axis of the spool 14 is thereby shifted from its position transversely of the longitudinal dimension of the fishing pole to a position parallel thereto. The original position is restored by rotating the arm 9 rearwardly by hand until the trigger snaps into engagement with the notch 16.

The reel is mounted on the fishing pole seat 4 with the fastening arms 2 engaged by the loops 3. With the spool in the position shown in Fig. 2 the fishing line wrapped thereon is drawn outwardly through eyes arranged on the pole and lure is attached to the weighted end thereof in the usual manner. In cast fishing the fisherman places his thumb against the periphery of the shoulder 17 or against one face of the spool to prevent rotation of the spool, and raises the pole to begin the cast, as indicated in dotted outline in Fig. 1. As the pole is swung forwardly to make the cast, the thumb pressure against the spool is released at a selected point along the arcuate path of the pole, and the trigger is pulled rearwardly. The arm 9 and spool 14 swing outwardly away from the base 5 quickly to the position shown in Fig. 3 and in full lines in Fig. 1. The outward pull of the weighted line induced by the swing of the pole causes the line to be paid off the spool. Since the axis of the spool is parallel with the longitudinal dimension of the pole, the line slithers off the spool in a spiralling manner. The spool, therefore, need not rotate, and hence no resistance to the uncoiling and casting of the line is produced.

When the cast has been made the spool is returned by hand to the position shown in Fig. 2, the trigger being engaged with the notch 16 to hold the parts in locked arrangement as explained hereinbefore. In this position the reel may be used in the conventional manner to play the fish or to reel in the line.

I claim:

1. A fishing reel comprising, in combination, an elongated base member, an arm pivotally joined to one end of said base member, spring means between said base and arm for urging said arm outwardly away from said base, a spool mounted on said arm for rotation about an axis normal to said arm, the opposite end of said base member having a transverse hole therein, trigger means resiliently pivoted on said base member and cooperating with said hole, and means on said arm receivable in said hole for engaging said trigger means releasably to hold said arm against said base member.

2. A fishing reel comprising, in combination, an elongated base member, means for securing said base member to a fishing pole, an arm pivotally joined to said base member, spring means between said base and arm for urging said arm outwardly away from said base, a spool rotatably mounted on said arm, said base member having a transverse hole therein, trigger means pivoted on said base member and cooperating with said hole, and a notched shaft on said arm receivable in said hole for engaging said trigger means releasably to hold said arm against said base member.

ROBERT D. COLGROVE.

REFERENCES CITED

The following references are of record in the file of this patent:

UNITED STATES PATENTS

| Number | Name | Date |
| --- | --- | --- |
| 1,133,254 | Backus | Mar. 30, 1915 |
| 1,434,325 | Brown | Oct. 31, 1922 |
| 2,512,170 | Oen | June 20, 1950 |

FOREIGN PATENTS

| Number | Country | Date |
| --- | --- | --- |
| 203,892 | Switzerland | July 1, 1939 |
| 429,774 | Great Britain | June 6, 1935 |
| 840,575 | France | Jan. 16, 1939 |
| 851,851 | France | Oct. 9, 1939 |